(12) United States Patent
Raggam

(10) Patent No.: US 6,597,306 B2
(45) Date of Patent: Jul. 22, 2003

(54) COMMUNICATION DEVICE FOR DETERMINING THE SEQUENCE OF DATA CARRIERS MOVING PAST SAID DEVICE

(75) Inventor: Peter Raggam, St. Stefan im Rosental (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/888,459

(22) Filed: Jun. 25, 2001

(65) Prior Publication Data

US 2002/0014987 A1 Feb. 7, 2002

(30) Foreign Application Priority Data

Jun. 27, 2000 (EP) .............................................. 00890201

(51) Int. Cl.[7] .............................. G01S 13/74; H04Q 5/22
(52) U.S. Cl. ......................... 342/42; 342/44; 340/10.4
(58) Field of Search ............ 342/42, 44; 340/10.1–10.6

(56) References Cited

U.S. PATENT DOCUMENTS

| 4,827,395 A | * | 5/1989 | Anders et al. ................ 342/44 |
| 5,621,411 A | | 4/1997 | Hagl et al. ..................... 342/42 |
| 5,864,301 A | * | 1/1999 | Jackson ........................ 340/72 |

FOREIGN PATENT DOCUMENTS

| EP | 0505982 A1 | 9/1992 |
| EP | 0757428 A1 | 2/1997 |

\* cited by examiner

*Primary Examiner*—Stephen C. Buczinski
(74) *Attorney, Agent, or Firm*—Steven R. Biren

(57) ABSTRACT

A communication device includes detection a detector (28) adapted to detect a value (V) which represents a maximum amplitude value of a data carrier signal (DS) produced by a data carrier as it moves through a communication range (KB) of the communication device along a predetermined path and received with the aid of a receiver (23) of the communication device. The detector is adapted to supply a detection signal (RS) upon detection of the value (V) representing the maximum amplitude value.

17 Claims, 3 Drawing Sheets

COMMUNICATION DEVICE FOR DETERMINING THE SEQUENCE OF DATA CARRIERS MOVING PAST SAID DEVICE

BACKGROUND OF THE INVENTION

This invention relates to a communication device for communication with a data carrier which is situated within a communication range of the communication device and which is movable through the communication range along a predetermined path, which communication device includes receiving means which are adapted to receive a data carrier signal which is supplied by a data carrier and which can be received with amplitude values of different magnitudes depending on the passage of the data carrier through the communication range.

A communication device of the type defined in the opening paragraph is known from U.S. Pat. No. 5,621,411 A.

During a process of determining the exact position of a data carrier relative to a communication coil configuration of a communication device, which data carrier is movable along a path, the known communication device utilizes means for computing the distance between the data carrier and the communication device, with the aid of which means the distance can be computed on the basis of an analog field strength of a data carrier signal received from the communication device. However, the know data carrier has the problem that the exact position of the data carrier with respect to the communication coil configuration can be determined only on condition that the data carrier has a given and consequently known orientation with respect to the communication coil configuration of the communication device. However, when the communication device is used in order to determine the exact position of a data carrier attached to, for example, a piece of cargo this condition can never be satisfied because the data carrier which is moved along a path by means of, for example, a conveyor arrangement may have an arbitrary orientation with respect to the communication coil configuration of the communication device. Furthermore, the known communication device has the problem that for determining the exact position of the data carrier the absolute value of the analog field strength is used, which particularly in view of tolerances in the fabrication of communication coils of different data carriers or tolerances in the fabrication or in operation of electric circuits of different data carriers may lead to invalidated results in the determination of the exact position. The invalidation of the results becomes particularly unacceptable when the absolute value of the analog field strength near a zero crossing of the analog field strength is used in order to determine the exact position because the means for computing the distance between the data carrier and the communication coil configuration can be utilized only when the field strength values are large enough, which reveals a fundamental problem of the known communication device, because the analog field strength of a data carrier signal received by the communication device usually exhibits small field strength values.

SUMMARY OF THE INVENTION

It is an object of the invention to solve the aforementioned problems of a communication device of the type defined in the opening paragraph and to provide an improved communication device such that, even for data carriers having arbitrary orientations with respect to a communication coil configuration of the communication device, a reliable determination of the exact position of the data carrier with respect to the communication coil configuration is guaranteed and tolerances of the data carrier do not lead to invalid results in the determination of the exact position.

The aforementioned object is achieved with a communication device of the type defined in the opening paragraph in that detection means for detecting a value representative of the maximum amplitude value of the data carrier signal supplied by a data carrier and received by the receiving means have been provided, and the detection means are adapted to generate and supply a detection signal upon detection of the value representative of the maximum amplitude value.

As a result of the provision of the characteristic features in accordance with the invention it is advantageously achieved that the exact position of the data carrier which is moved along a given path, for example with a constant speed by means of a conveyor arrangement, can be determined through the detection of the value representative of the maximum amplitude value after the generation and supply of the detection signal, in the first place for a data carrier that is oriented arbitrarily relative to the communication coil configuration, in the second place independently of its tolerances, and in the third place independently of the materials in its vicinity. Moreover, the advantage is obtained that, even in the case that two or more adjacent data carriers which are moved through the communication range with the aid of the conveyor arrangement at substantially the same time, a sequence of these data carriers can be determined with a high accuracy merely with the aid of the detection signals produced by the data carrier signals of each data carrier.

As a result of the provision of the characteristic features as defined in claim 2 it is advantageously achieved that the detection of value of the received data carrier signal which is representative of the maximum amplitude value can be detected with the aid of the control means and the memory means and the comparison means without knowledge of an absolute value of an amplitude value of the data carrier signal and advantageously by means of a comparison of amplitude values of the received data carrier signal which have been determined in temporal succession. During the comparison it is very simple to determine a change in course of a gradient of the amplitude values of the received data carrier signal determined in temporal succession, as a result of which in the case of a zero crossing in the course of the gradient the comparison means can determine this zero crossing with the aid of the comparison result signal and the detection signal can be generated in conformity with the comparison result signal.

As a result of the provision of the characteristic features as defined in claim 3 it is advantageously achieved that during the formation of the detection signal the comparison result signal enables not only the value representative of the maximum amplitude value to be determined but also enables a movement of the data carrier relative to the communication coil configuration to be detected because during a movement of the data carrier comparison result signals generated in temporal sequence, which represent for example differences between temporally adjacent amplitude values, should differ at least slightly from one another.

As a result of the provision of the characteristic features as defined in claim 4 it is advantageously achieved that the detection signal generator can be started with the aid of the comparison result signal and that subsequently, with the aid of the detection signal generator characteristic-value signals, which occur in the communication device and which may, for example, be formed by data contained in the data carrier signal, can be used for the generation of the detection signal, which data can then be supplied to a control device, which can be connected to for example the communication device, for further processing, essentially in synchronism with the detection of the value representative of the maximum amplitude value by the communication device with the aid of the detection signal.

As a result of the provision of the characteristic features as defined in claim 5 it is advantageously achieved that, as long as the data carrier is moved along its predetermined path, the time data enable the exact position of the data carrier to be determined precisely at any instant after the detection of the value representative of the maximum amplitude value.

The aforementioned aspects as well as further aspects of the invention will be apparent from the examples of embodiments described hereinafter and will be elucidated with the aid of these examples.

The invention will be described in more detail hereinafter with reference to two embodiments which are shown in the drawings by way of example but to which the invention is not limited.

DESCRIPTION OF THE PREFERRED EMBODIMENTS

Figure 1:
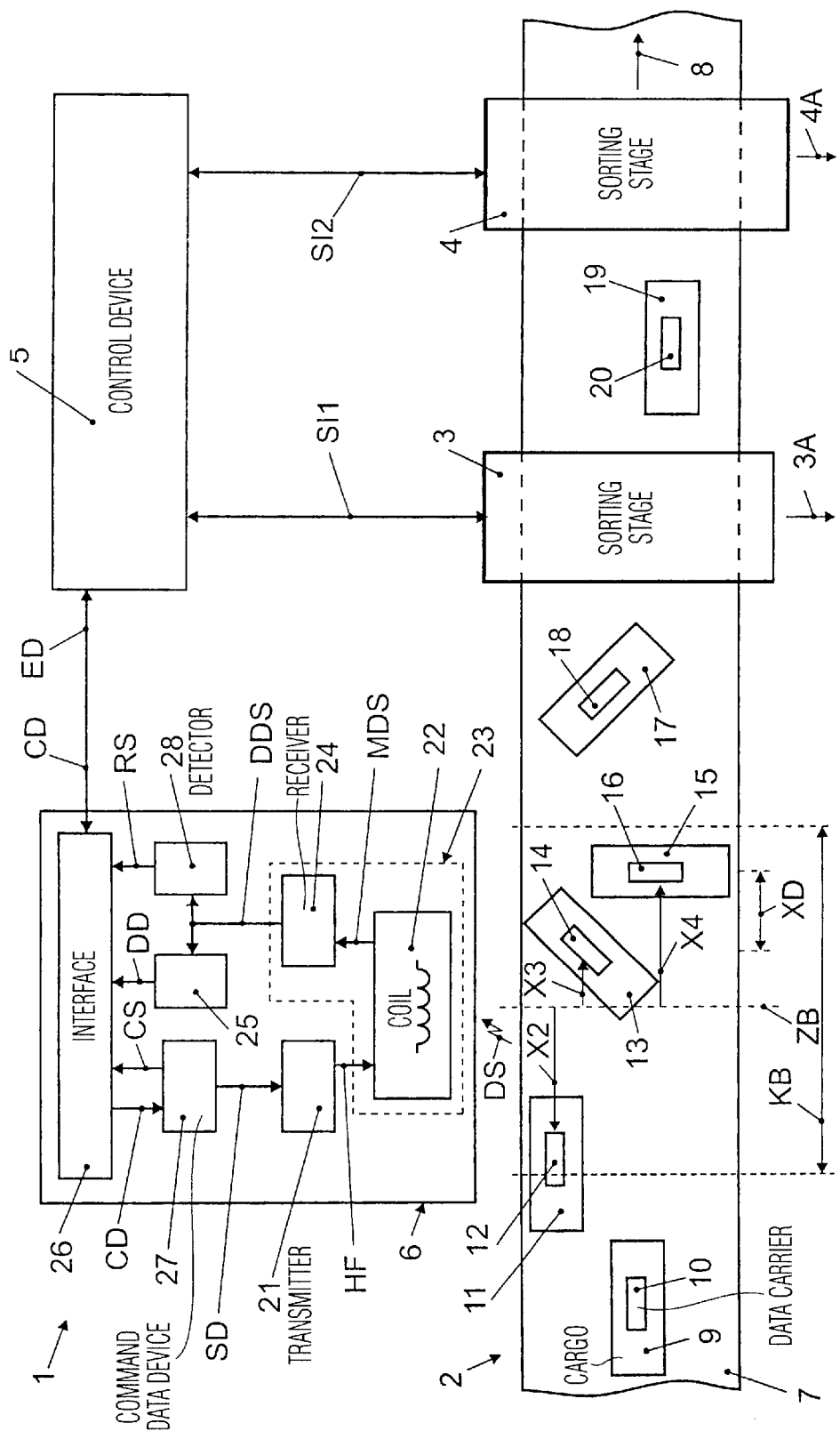
FIG. 1 diagrammatically shows a cargo sorting arrangement as a typical application for a communication device in accordance with the invention, FIG. 1 showing a communication device in accordance with a first embodiment.

FIG. 1 shows a cargo sorting arrangement 1 which includes a conveyor arrangement 2 and a first sorting stage 3 and a second sorting stage 4 and a control device 5 as well as a communication device 6. Of the conveyor arrangement 2 only a conveyor belt 7 is shown, which is moved past the communication device 6 in a predetermined transport direction 8 with a predetermined transport speed, through the first sorting stage 3 and through the second sorting stage 4, the first sorting stage 3 being adapted to sort cargo in accordance with sorting information SI1 receivable by this stage, in a first sorting direction 3A, and the second sorting stage 4 being adapted to sort cargo in accordance with second sorting information SI2 receivable by this stage, in a second sorting direction 4A.

FIG. 1 shows, lying on the conveyor belt 7, a first piece of cargo 9, provided with a first data carrier 10, and a second piece of cargo 11, provided with a second data carrier 12, and a third piece of cargo 13, provided with a third data carrier 14, and a fourth piece of cargo 15, provided with a fourth data carrier 16, and a fifth piece of cargo 17, provided with a fifth data carrier 18, as well as a sixth piece of cargo 19, provided with a sixth data carrier 20. The six pieces of cargo 9, 11, 13, 15, 17 and 19 are situated on the conveyor belt 7 and are moved in the transport direction 8, i.e. along a predetermined path.

The communication device 6 is adapted to communicate with each data carrier 10, 12, 14, 16, 18 and 20 disposed within its communication range KB, the communication range KB having a central area ZB. During the communication with the data carriers 10, 12, 14, 16, 18 and 20 a time-slot process is used which is well-known to one skilled in the art, as a result of which communication with a selected data carrier 10 or 12 or 14 or 16 or 18 or 20 situated within the communication range KB is also possible when more than one of the data carriers 10, 12, 14, 16, 18 and 20 are situated within the communication range KB simultaneously with the selected data carrier 10 or 12 or 14 or 16 or 18 or 20, as for example in the case shown in FIG. 1 for the second data carrier 12 and the third data carrier 14 as well as the fourth data carrier 16 at a given instant. The time slot process enables a time-sequential communication of the communication device 6 with each of the three data carriers 12, 14 and 16 to be realized.

Figure 2:
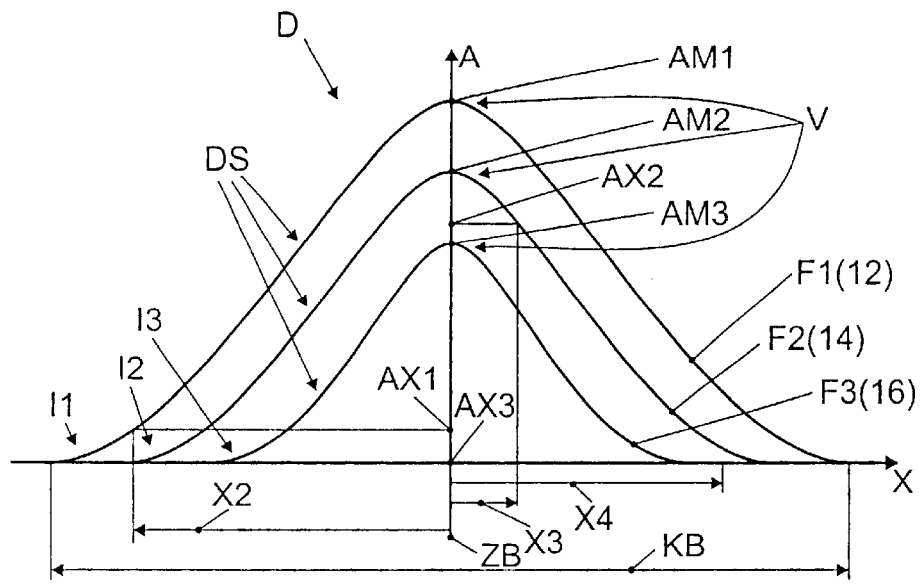
FIG. 2 diagrammatically shows three different amplitude waveforms of three data carrier signals received with the aid of the communication device shown in FIG. 1, which signals are each supplied by one of three data carriers as the three data carriers pass through a communication range of the communication device.

For the purpose of communicating during a time slot the communication device 6 includes a transmitting stage 21 adapted to receive transmission data SD. The transmitting stage 21 further includes a high-frequency generator, which is not shown in FIG. 1 and which is adapted to generate a high-frequency carrier signal HF. The transmitting stage 21 further includes a modulator, which is not shown in FIG. 1 and which is adapted to modulate the carrier signal HF in accordance with the transmission data SD, the modulation in the present case being an amplitude modulation but other types of modulation being likewise possible. The transmitting stage 21 is further adapted to supply the carrier signal HF modulated in accordance with the transmission data SD to a communication coil configuration 22. By means of the communication coil configuration 22 the communication device 6 can transmit the modulated carrier signal HF and, as a consequence, power to any data carrier 10, 12, 14, 16, 18 or 20 located within the communication range KB. With the aid of the transmitted power it is possible to activate an electric circuit included in each of the data carriers 10, 12, 14, 16, 18 and 20 but not shown in FIG. 1, the electric circuit being adapted to receive the modulated carrier signal HF and to evaluate the transmission data SD modulated onto the modulated carrier signal HF and, on the basis of the evaluation of the transmission data SD, to generate data carrier data DD and to transmit said data carrier data DD to the communication device 6 with the aid of a load modulation of the modulated carrier signal HF. The data carrier data DD transferred by means of the load modulation form part of a data carrier signal DS, an amplitude of the data carrier signal DS received from the relevant data carrier 10, 12, 14, 16, 18 or 20 by the communication device 6, which amplitude is representative of the strength of the load modulation of the load-modulated carrier signal HF, being essentially dependent on a position coordinate measured in relation to the central area ZB. In FIG. 2 this is illustrated for the instantaneous situation shown in FIG. 1, where the second data carrier 12 and the third data carrier 14 as well as the fourth data carrier 16 are situated within the communication range KB, the second data carrier 12 having a distance X2 from the central area ZB, the third data carrier 14 having a distance X3 from the central area, and the fourth data carrier 16 having a distance X4 from the central area ZB. Since each of the three data carriers 12, 14 and 16 situated within the communication range KB has a different orientation with respect to the predetermined transport direction 8 and, moreover, each of the three data carriers 12, 14 and 16 has different mechanical as well as electrical tolerances and each of the three data carriers 12, 14 and 16 may be situated on a piece of cargo with different materials, the passage of the three data carriers 12, 14 and 16 through the communication range KB results in similar amplitude waveforms, which differ comparatively strongly from one another, for each of the data carrier signals DS supplied by the respective data carriers 12, 14 and 16, as is apparent from FIG. 2.

FIG. 2 shows a diagram D in which amplitude values A of the amplitude of the data carrier signal DS received by the communication device 6 from the respective data carriers 12, 14 and 16 within the communication range KB are plotted on the y-axis as a function of a position coordinate X plotted on the x-axis and referred to the central area ZB. In the present case the diagram D shows a first amplitude waveform F1 produced by the second data carrier 12 as it passes through the communication range KB, and a second amplitude waveform F2 produced by the third data carrier 14 as it passes through the communication range KB, as well as a third amplitude waveform F3 produced by the fourth data carrier 16 as it passes through the communication range KB. For the second data carrier 12 a first amplitude detection position I1, for the third data carrier 14 a second amplitude detection position I2, which differs from the first amplitude detection position I1, as well as a third amplitude detection position I3, which differs from the second amplitude detection position I2, can be read from the x-axis in the diagram D. When communication of the communication device 6 with one of the data carriers 12, 14 or 16 begins the data carrier signal DS from the relevant data carrier 12, 14 or 16 can be detected for the first time at the amplitude detection positions I1, I2 and I3, upon which a time slot for the transfer of the data carrier signal DS to the communication device 6 is allocated to the relevant data carrier 12, 14 or 16. During a movement of the data carrier 12, 14 or 16 in the transport direction 8 the amplitude values A of the data carrier signal DS increases starting at the respective amplitude detection position I1, I2 or I3, until eventually a first maximum amplitude value AM1, or a second maximum amplitude value AM2 or a third maximum amplitude value AM3 is reached in accordance with the amplitude waveform F1, F2 or F3 at the location of the central area ZB. After passage through the central area ZB the amplitude values of the data carrier signal DS decrease in accordance with the respective amplitude waveform F1, F2 or F3.

In the instantaneous situation represented in FIG. 1 with regard to the passage of the three data carriers 12, 14 and 16 through the communication range KB an amplitude value AX1 in accordance with the first amplitude waveform F1 is obtained for the data carrier signal DS which is produced by the second data carrier 12 having the position coordinate X2 and which is received by the communication device 6. Furthermore, an amplitude value AX2 in accordance with the second amplitude waveform F2 is obtained for the data carrier signal DS which is produced by the third data carrier 14 having the position coordinate X3 and which is received by the communication device 6. Moreover, an amplitude value AX3 in accordance with the third amplitude waveform F3 is obtained for the data carrier signal DS which is produced by the fourth data carrier 16 having the position coordinate X4 and which is received by the communication device 6. Thus, in the instantaneous situation represented in FIG. 1, i.e at the instant represented in FIG. 1, the communication device 6 can only receive the data carrier signal DS produced by the second data carrier 12 and by the third data carrier 14, for example owing to the orientation of the fourth data carrier 16, although all three data carriers 12, 14 and 16 are within the communication range KB.

The communication device 6 includes receiving means 23 for receiving the data carrier signal DS. The receiving means 23 of the communication device 6 are formed with the aid of the communication coil configuration 22 and a receiving stage 24. The communication coil configuration 22 can supply the received data carrier signal DS to the receiving stage 24 as a load-modulated data carrier signal MDS. The receiving stage 24 is adapted to receive the load-modulated data carrier signal MDS. The receiving stage 24 has filter means and demodulation means as well as analog-to-digital converter means, which are not shown in FIG. 1 and which enable the load-modulated data carrier signal MDS to be converted, as regards its amplitude A, into a digitized data carrier signal DDS. The receiving means 23 are further adapted to supply the digitized data carrier signal DDS.

The communication device 6 further includes evaluation means 25 adapted to receive the digitized data carrier signal DDS. The evaluation means 25 are further adapted to evaluate the digitized data carrier signal DDS as regards an information content contained in the digitized data carrier signal DDS. For the evaluation the evaluation means 25 are adapted, in the present case, to generate the original data carrier data DD transmitted with the aid of the data carrier signal DS and received by the communication device 6 and to supply the data carrier data DD to the interface means 26. In the present case, the data carrier data DD include destination information by means of which an unambiguous allocation of each data carrier 10, 12, 14, 16, 18 or 20 to either the first sorting stage 3 or the second sorting stage 4 is possible and by means of which the first sorting information SI1 or the second sorting information SI2 can be generated in the control device 5.

The interface means 26 are adapted to receive the data carrier data DD and to convert the data carrier data DD in accordance with a communication protocol into reception data ED receivable by the control device 5 and to supply said receiving data ED to the control device 5. The interface means 26 are further adapted to receive command data CD from the control device 5 and to convert said command data CD in accordance with the communication protocol into command data CD that can be supplied from the interface means 26 to command data execution means 27.

The command data execution means 27 are adapted to receive the command data CD and to execute the commands contained in the command data CD. During the execution of the commands the command data execution means 27 are adapted to transfer the transmission data SD contained in the command data CD to the transmitting stage 21. Furthermore, the command data execution means 27 are adapted, during the execution of the commands, to generate and supply an interface control signal CS to the interface means 26, the interface control signal CS enabling a supply of the reception data ED from the interface means 26 to the control device 5 to be initiated.

Advantageously, the communication device 6 also includes detection means 28 which, similarly to the evaluation means 25, are also adapted to receive the digitized data carrier signal DDS. However, in contradistinction to the evaluation means 25, the detection means 28 are adapted to detect a value V representing a maximum amplitude value of the digitized data carrier signal DDS and, consequently, a maximum amplitude value of the data carrier signal DS received by the receiving means 23, which value V is, for example, shown in the diagram D of FIG. 2 for the three amplitude waveforms F1, F2 and F3 in the direct proximity of the three maximum amplitude values AM1, AM2 and AM3. The detection means 28 are further adapted, during the detection of the value V representative of the maximum amplitude value of the received data carrier signal DS, to generate and to supply a detection signal RS, which detection signal RS can be received by the interface means 26 and can be supplied to the control device 5 with the aid of the interface means 26 in accordance with the communication protocol when the interface control signal CS is present.

Thus, with the aid of the detection means 28 it is possible to detect in a very simple manner the passage of each of the data carriers 10, 12, 14, 16, 18 and 20 shown in FIG. 1 through the central area ZB of the communication range KB of the communication device 6, because it is possible to detect a value V representative of the maximum amplitude value of the data carrier signal DS exactly at an instant of passage through the central area ZB. This has the major advantage that the passage through the central area ZB can be detected independently of an absolute value of the maximum amplitude value of the data carrier signal DS and independently of the respective amplitude detection positions, i.e. for example independently of the respective amplitude detection positions I1, I2 and I3 of the second data carrier 12, of the third data carrier 14 and of the fourth data carrier 16, which further yields the advantage that the passage through the central area ZB can also be detected reliably by the detection of the value V in the case of different orientations or in the case of different electrical or mechanical tolerances of the data carriers 10, 12, 14, 16, 18 and 20 as well as in the case of different materials of the pieces of cargo 9, 11, 13, 15, 17 and 19.

In the present case, the data carrier data DD are formed, for example, with the aid of destination information by means of which the control device 5 can decide whether the respective data carrier 10, 12, 14, 16, 18 or 20 is to be sorted out along the first sorting direction 3A within the first sorting stage 3 or along the second sorting direction 4A within the second sorting stage 4. On the basis of the detection signal RS supplied by the communication device 1 and on the basis of a constant transport velocity of the pieces of cargo 9, 11, 13, 15, 17 and 19 the control device 5 is capable of determining when after reception of the detection signal RS the piece of cargo 9, 11, 13, 15, 17 or 19 provided with the respective data carrier 10, 12, 14, 16, 18 or 20 is located within the first sorting stage 3 or the second sorting stage 4.

Figure 3:
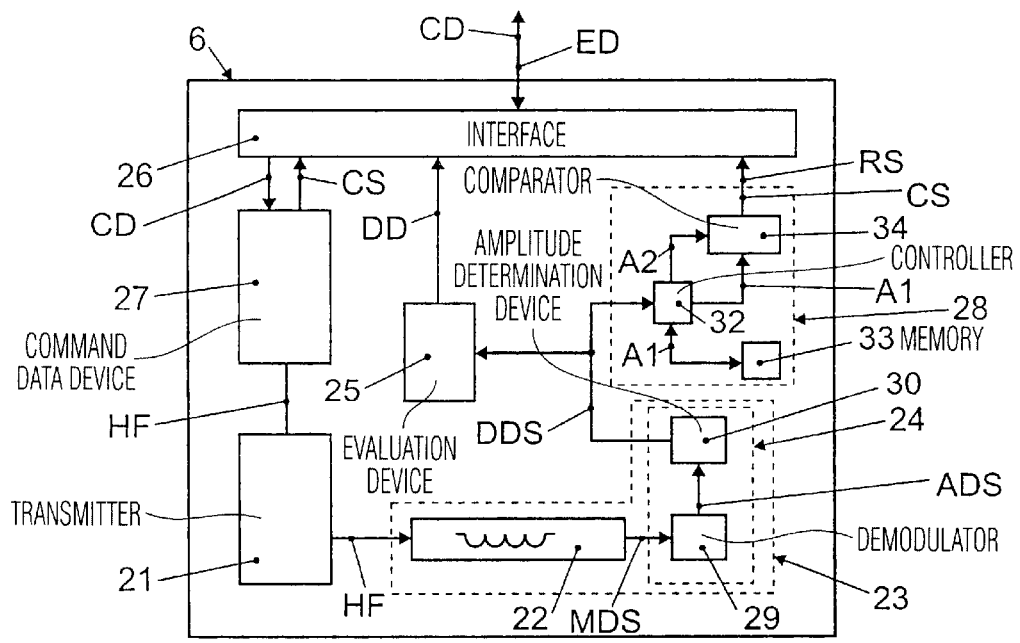
FIG. 3 is a block diagram which diagrammatically shows a relevant part of a communication device in accordance with a second embodiment of the invention.

FIG. 3 shows a communication device 6 in accordance with a second embodiment of the invention.

In the communication device 6 shown in FIG. 3 the receiving means 24 are formed with the aid of demodulator means 29 and with the aid of determining means 30. The demodulator means 29 are adapted to receive the load-modulated data carrier signal MDS and to demodulate the load-modulated data carrier signal MDS. Furthermore, the demodulator means 29 are adapted to supply a demodulated data carrier signal ADS to the determining means 30 after the demodulation.

The determining means 30 are adapted to receive the demodulated data carrier signal ADS and to determine amplitude values of the demodulated data carrier signal ADS. During the determining means 30 are adapted to generate and to supply the digitized data carrier signal DDS during the determining process. The determining means 30 are realized with the aid of an analog-to-digital converter, by means of which the demodulated data carrier signal ADS can be quantized as regards its analog amplitude values and digitized amplitude values can be formed, the digitized data carrier signals DDS being formed with the aid of the digitized amplitude values.

In the second embodiment of the invention the detection means 28 are formed with the aid of control means 32 and with the aid of amplitude value memory means 33 and with the aid of comparison means 34.

The control means 32 are adapted to receive the digitized data carrier signal DDS and, on the basis of the digitized data carrier signal DDS, control a supply of a determined first amplitude value A1 to the amplitude value memory means 33, the determined first amplitude value A1 being representative of the amplitude of the data carrier signal DS which can be received by the communication device 6 from a selected data carrier 10, 12, 14, 16, 18 or 20 during the communication in a first time slot. The control means 32 are further adapted to control a supply of the first amplitude value A1, which can be received by the amplitude valve memory means 33, to the comparison means 33. The control means 32 are further adapted to control a supply of a determined second amplitude value A2 to the comparison means 34, the second amplitude value A2 being representative of the amplitude of the data carrier signal DS which can be received, in a second time slot, by the communication device 6 during the communication with the data carrier 10, 12, 14, 16, 18 or 20 selected in the first time slot. The control means 32 are further adapted to replace the first amplitude value A1, previously stored in the amplitude valve memory means 33, with the second amplitude value A2, the second amplitude value A2 then forming a new first amplitude value A1 in the amplitude value memory means 33. Thus, the control means 32 are adapted to control an allocation of the amplitude value, determined with the aid of the determining means 30 and represented with the aid of the digitized data carrier signal DDS, to the amplitude value memory means 33 and the comparison means 34.

The amplitude value memory means 33 are adapted to receive the first amplitude value A1 from the control means 32 and to store the first amplitude value A1 and to supply the first amplitude value A1 to the control means 32. Thus, the amplitude valve memory means 33 serve for the temporary storage of an amplitude value A1 of the data carrier signal DS, which is determined during a first time slot and which is received from the data carrier 10, 12, 14, 16, 18 or 20 selected in the first time slot, until the second amplitude value A2 of the data carrier signal DS can be determined in a second time slot during a communication with the same data carrier 10, 12, 14, 16, 18 or 20 selected previously in the first time slot. The two amplitude values A1 and A2 can be supplied from the control means 32 to the comparison means 34 as soon as the first amplitude value A1 and the second amplitude value A2 have been determined for one and the same data carrier 10, 12, 14, 16, 18 or 20.

The comparison means 34 are adapted to receive the first amplitude value A1 and the second amplitude value A2 from the control means 32. The comparison means 34 are further adapted to compare the stored first amplitude value A1 with the second amplitude value A2 determined after the stored first amplitude value A1, upon which a first comparison result, which indicates that the second amplitude value A is greater than the first amplitude value A1, and a second comparison result, which indicates that the second amplitude value A2 is smaller than the first amplitude value A1, can be generated. The presence of the second comparison result then means the detection of the value V representative of the maximum amplitude value of the data carrier signal DS supplied by a data carrier 10, 12, 14, 16, 18 or 20 and received by the receiving means 23, which value V is formed by the first amplitude value A1. The comparison means 34 are further adapted to generate a comparison result signal CS on the basis of the comparison results, the comparison result signal CS, which can be supplied to the interface means 26 by the comparison means 34, forming the detection signal RS.

Figure 4:
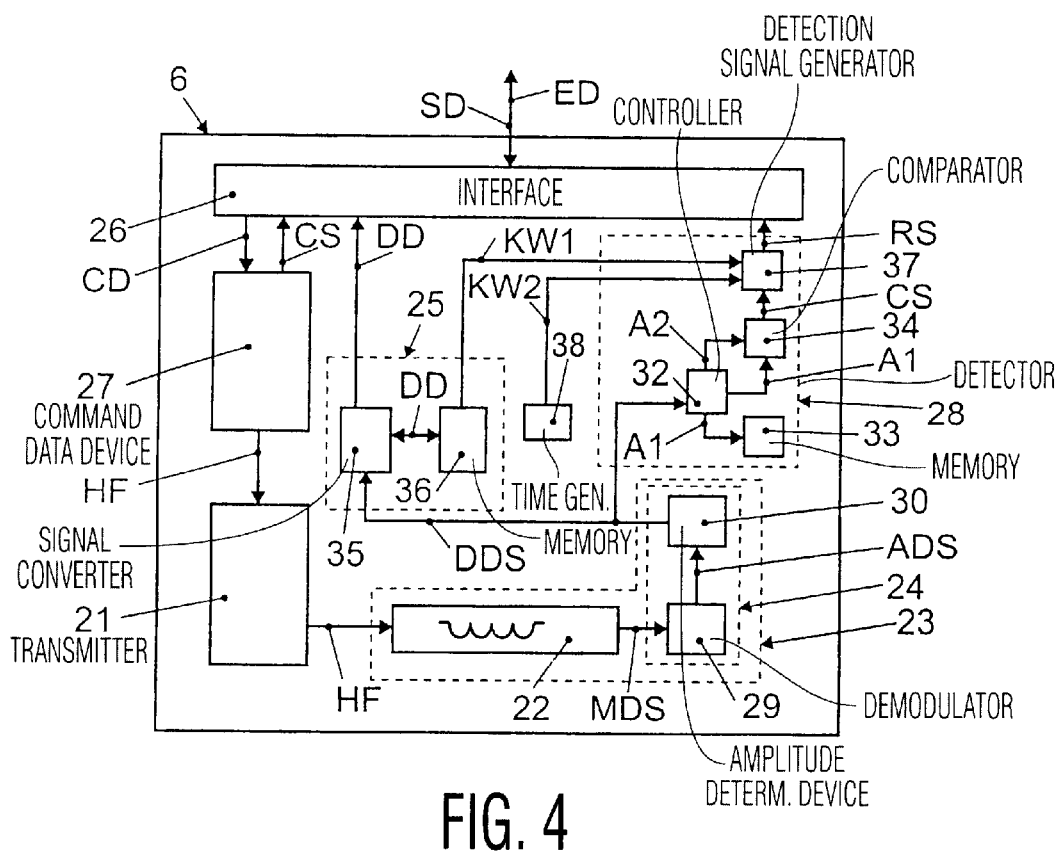
FIG. 4 shows, in a manner similar to FIG. 3, a revelant part of a communication device in accordance with a third embodiment of the invention.

FIG. 4 shows a communication device 6 in accordance with a third embodiment of the invention.

The evaluation means 25 of the communication device 6 shown in FIG. 4 include a data carrier signal converter stage 35 and data-carrier-data memory means 36. During the evaluation of the digitized data carrier signal DDS the data carrier signal converter stage 35 of the evaluation means 25 enable the digitized data carrier signal DDS to be converted into the data carrier data DD. The data carrier converter stage 35 is adapted to supply the data carrier data DD to the interface means 26 and to store the data carrier data DD in the data-carrier-data memory means 36, which are adapted to store the data carrier data DD. The data carrier signal converter stage 35 is further adapted to read out the data carrier data DD stored in the data-carrier-data memory means 36. In the present case, the data carrier data DD include a data carrier identification number, with the aid of which an unambiguous identification of each data carrier 10, 12, 14, 16, 18 or 20 is possible during the communication with the communication device 6. In the present case, the data carrier identification number forms a first characteristic-value signal KW1, which can be supplied to a detection signal generator 37 by the data-carrier-data memory means 36.

The communication device 6 further includes a time data generator 38, which is adapted to generate and to supply time data, the time data forming a second characteristic-value signal KW2, which can be supplied to the detection signal generator 37 by the time data generator 38.

The detection signal generator 37 is adapted to receive the first characteristic-value signal KW1 and the second characteristic-value signal KW2 as well as the comparison result signal CS. The detection signal generator 37 are further adapted to generate the detection signal RS with the aid of the two characteristic-value signals KW1 and KW2 and in dependence on the comparison result signal CS. In the present case, the detection signal RS can be generated exactly when the comparison result signal CS represents the second comparison result that can be produced by the comparison means 34. The detection signal RS can be generated by the detection signal generator 37 in such a manner that it includes the respective identification number represented by means of the first characteristic-value signal KW1 and the time data which are represented with the aid of the second characteristic-value signal KW2 and which can be received from the time data generator 38 at the instant of the detection of the value V representing the maximum amplitude value of the received data carrier signal DS. The detection signal generator 37 is further adapted to supply the detection signal RS to the interface means 26.

This has the advantage that for a data carrier 10, 12, 14, 16, 18 or 20 which passes through the central area ZB the current position of the respective data carrier 20 moved by means of the conveyor belt 7 can be determined in the control device by means of the time data in the detection signal RS with an accuracy that is satisfactory for sorting within the first sorting stage 3 or the second sorting stage 4. Furthermore, the advantage is obtained that during the passage through the central area ZB a sequence of the data carriers 10, 12, 14, 16, 18 and 20 relative to one another can be determined in a very simple manner because the identification numbers and the time data for each of the data carriers 10, 12, 14, 16, 18 or 20 are contained in the respective detection signal RS.

Figure 5:
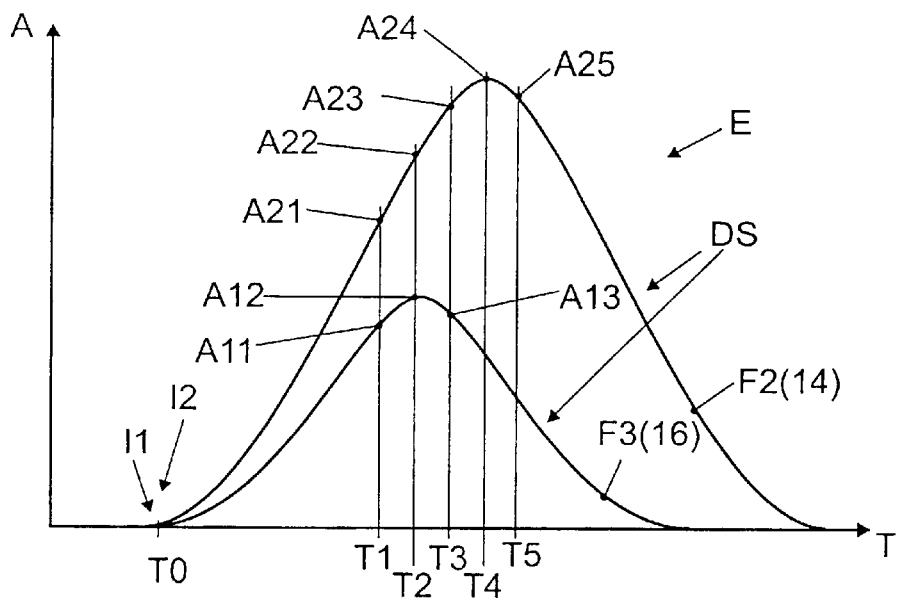
FIG. 5 shows a diagram of amplitude values A of data carrier signals versus time (T).

The operation of the communication device 6 shown in FIG. 4 is now clarified with the aid of an example of use of the communication device 6 with reference to the diagram E shown in FIG. 5.

FIG. 5 shows a diagram E in which amplitude values A of data carrier signals DS received from the communication device 6 can be read as a function of time T plotted on the x-axis.

In this example of use it is assumed that the third data carrier 14 shown in FIG. 1 and the fourth data carrier 16 shown in FIG. 1 are moved through the communication range KB of the communication device 6 in the transport direction 8 with the aid of the conveyor belt 7 with a constant transport speed. The third data carrier 14 and the fourth data carrier 16 are assumed to have a distance DX relative to one another so that as the two data carriers 14 and 16 approach the second amplitude detection position I2 and the third amplitude detection position I3 coincide at an instant T0 indicated in FIG. 5. It is further assumed that the third data carrier 14 and the fourth data carrier 16 have different orientations relative to the communication coil configuration 22, which during the passage of the third data carrier 14 and of the fourth data carrier 16 through the communication range KB results in the second amplitude waveform F2, shown in FIG. 5, for the third data carrier 14 and the third amplitude waveform F3, also shown in FIG. 5, for the fourth data carrier 16. The second amplitude waveform F2 and the third amplitude waveform F3 are shown as functions of time T, starting at the starting instant T0 in FIG. 5.

In the present case it is not possible to determine for both data carriers 14 and 16 the sequence of passing through the communication range KB of the communication device 6 or the position after passage through the communication range 6 on the basis of a determination of an absolute value of the amplitude of the relevant data carrier signal DS or on the basis of a determination of an instant T at which the respective data carrier signal DS is detected for the first time. In order to enable the sequence or the positions of the two data carriers 14 and 16 on the conveyor belt 7 to be determined it is advantageous to use the detection means 28, to which the digitized data carrier signal DDS generated in the determining means 30 is applied.

Thus, during the communication the determining means 30 for example determine an amplitude value A11 for a data carrier signal DS of the fourth data carrier 16 at a first instant T1 in FIG. 5 with the aid of the time slot process and supply this to the control means 32, the control means 32 storing the amplitude value A11 in the amplitude value memory means 33 as the first amplitude value A1 of the fourth data carrier 16. Quasi-simultaneously to this, an amplitude value A21 is determined for a data carrier signal DS of the third data carrier 14 and is supplied to the control means 32, the control means 32 storing the amplitude value A21 in the amplitude value memory means 33 as the first amplitude value A1 of the third data carrier 14.

After the first instant T1, at a second instant T2 indicated in FIG. 5, an amplitude value A12 is determined for the fourth data carrier 16 and is supplied to the control means 32, the control means 32 supplying the amplitude value A12 to the comparison means 34 as the second amplitude value A2 of the fourth data carrier 14 and reading the amplitude value A12 forming the first amplitude value A1 of the fourth data carrier 16 from the amplitude value memory means 33 and supplying this value also to the comparison means 34. The comparison means 34 now compare the first amplitude value A1 of the fourth data carrier 16 with the second amplitude value A2 of the fourth data carrier 16 and generate the first comparison result. Subsequently, the amplitude value A11, which is stored in the amplitude-value memory means 33 and which forms the first amplitude value A1 of the fourth data carrier 16, is overwritten with the amplitude value A12 with the aid of the control means 32. Quasi-simultaneously to this and similarly to the process described hereinbefore, an amplitude value A22 is determined as the second amplitude value A2 and with the aid of the comparison means 34 it is compared with the first amplitude value A1 of the third data carrier 14, upon which likewise the first comparison result is generated. With the aid of the control means 32 the amplitude value A21, which forms the first amplitude value A1 of the third data carrier 14, is overwritten with the amplitude value A22.

After the second instant T2, at a third instant T3 indicated in FIG. 5, an amplitude value A13 is determined for the fourth data carrier 16 and is supplied to the control means 32, the control means 32 supplying the amplitude value A13 to the comparison means 34 as the second amplitude value A2 of the fourth data carrier 16 and reading the amplitude value A12 forming the first amplitude value A1 of the fourth data carrier 16 from the amplitude value memory means 33 and supplying the first amplitude value A1 of the fourth data carrier 16 also to the comparison means 34. The comparison means 34 now compare the amplitude value A12 forming the first amplitude value A1 with the amplitude value A13 forming the second amplitude value A2 of the fourth data carrier 16 and generate the second comparison result. Subsequently, the detection signal RS is generated by the detection signal generator 37 with the aid of the comparison signal CS supplied by the comparison means 34 and representing the second comparison result, in such a manner that it exhibits the identification number of the fourth record carrier 16 and includes time data representing the third instant T3. Thus, at the instant T3 the value V with the amplitude value A12 is formed, which value V represents the maximum amplitude value of the data carrier signal DS supplied by the fourth data carrier 16 and received by the receiving means 23. A subsequent detection of the value V for the fourth data carrier 16 may already be terminated at the instant T3. Quasi-simultaneously to this and similarly to the process described hereinbefore, an amplitude value A23 is determined as the second amplitude value A2 for the third record carrier 14 and with the aid of the comparison means 34 it is compared with the amplitude value A22 forming the first amplitude value A1 of the third data carrier 14, upon which likewise the first comparison result for the third data carrier 14 is generated. With the aid of the control means 32 the amplitude value A22, which forms the first amplitude value A1 of the third data carrier 14, is overwritten with the amplitude value A23.

After the third instant T3, at a fourth instant T4 indicated in FIG. 5, an amplitude value A24 is determined for the third data carrier 16, which by analogy with the above is compared with the amplitude value A23, upon which likewise the first comparison result is generated and the amplitude value A23 forming the first amplitude value A1 of the third data carrier 14 is overwritten with the amplitude value A24.

In the present case, at an instant T5 after the instant T4, an amplitude value A25 is now determined for the third data carrier 14 and compared with the amplitude value A24 in the comparison means 34, upon which the comparison means 34 supply the comparison signal CS representing the second comparison result to the detection signal generator 37. Subsequently, the detection signal generator 37 supplies the detection signal RS in such a manner that it has the identification number of the third data carrier 14 and includes time data representing the fourth instant.

Thus, at the instant T5 the value V with the amplitude value A24 is formed, which value V represents the maximum amplitude value of the data carrier signal DS supplied by the third data carrier 14 and received by the receiving means 23.

It is to be noted that the detection means 28 include computing means and that, on the basis of the first amplitude value A1 and the second amplitude value A2 and the fact that the conveyor belt 7 has a constant transport speed, the computing means are adapted to compute interpolation parameters of a linear interpolation between the first amplitude value A1 and the second amplitude value A2. Furthermore, it is to be noted that the comparison means 34 may be adapted to compare the interpolation parameters with threshold values. In the present case, the interpolation parameters are formed by a gradient value between the two amplitude values A1 and A2 and an ordinate intercept value. For example, the value zero may be used as threshold value for the gradient value. The comparison result signal CS may then represent the presence of a gradient value below the value zero.

Furthermore, it is to be noted that the detection means 28 may include interpolation memory means adapted to store the interpolation parameters computed during the communication with one and the same data carrier 10, 12, 14, 16, 18 or 20 in consecutive time slots. The comparison means 34 may then also be adapted to compare the interpolation parameters computed and stored in the consecutive time slots with one another or with threshold values.

Moreover, it is to be noted that the computing means are advantageous in the case of an application where a large number of data carriers 10, 12, 14, 16, 18 or 20 are located simultaneously within the communication range KB of the communication device 6 and where consequently longer communication pauses occur between the consecutive time slots during communication with one and the same data carrier 10, 12, 14, 16, 18 or 20, because in particular with the aid of the computing means and on the basis of the interpolation means a precise calculation is possible of the instant at which a selected data carrier 10, 12, 14, 16, 18 or 20 passes through the central area ZB of the communication range KB.

Furthermore, it is to be noted that the detection means 28 may include amplitude waveform memory means adapted to store amplitude values A of at least one amplitude waveform of a received data carrier signal DS. In this respect, it is to be noted that the control means 32, after the first detection of the data carrier signal DS, are adapted to subsequently store the entire amplitude waveform. Besides, it is to be noted that the control means 32 are subsequently adapted to control the supply of first amplitude values A and of second amplitude values A2 in accordance with the stored amplitude waveform to the comparison means 34. In this respect, it is to be noted further that the communication device 6 may have time data memory means which are adapted to store the time data forming the second characteristic value KW2 synchronously with the storage of an amplitude waveform. This has the advantage that a detection of a value V representing the maximum amplitude value of a supplied by a data carrier 10, 12, 14, 16, 18 or 20 and received by the receiving means 23 is also possible after the relevant data carrier 10, 12, 14, 16, 18 or 20 has passed through the communication range KB and the instant of passage through the central area ZB can be determined on the basis of the stored time data. This may be important particularly in connection with a communication coil configuration 22 comprising a plurality of separate coils because in that case the amplitude waveform for each individual coil can be stored with the aid of the amplitude waveform memory means, as a result of which detection of the value V is possible with a high accuracy.

What is claimed is:

1. A communication device for communication with a data carrier situated within a communication range (KB) of the communication device, the data carrier being movable through the communication range along a predetermined path, the communication device comprising:
   receiving means adapted to receive a data carrier signal (DS) which is supplied by a data carrier and which can be received with amplitude values (A1, A2) of different magnitudes depending on the passage of the data carrier through the communication range, and
   detection means for detecting a value (V) representative of the maximum amplitude value of the data carrier signal (DS) supplied by a data carrier and received by the receiving means, wherein the detection means is adapted to generate and supply a detection signal (RS) upon detection of the value (V) representative of the maximum amplitude value.

2. A communication device as claimed in claim 1, characterized in that the detection means includes control means adapted to control an allocation of the detected amplitude values (A1, A2) to amplitude value memory means and to comparison means, wherein,
   the amplitude value memory means is adapted to store a detected amplitude value (A1),
   the comparison means is adapted to compare the stored amplitude value (A1) with an amplitude value (A2) determined after the stored amplitude value (A1) and to generate and supply a comparison result signal (CS) on the basis of the comparison result, and
   the detection means is adapted to generate the detection signal (RS) in conformity with the comparison result signal (CS).

3. A communication device as claimed in claim 2, characterized in that the detection signal (RS) is formed by the comparison result signal (CS).

4. A communication device as claimed in claim 2, further comprising a detection signal generator adapted to receive the comparison result signal (CS) and to receive at least one characteristic value signal (KW1, KW2) appearing in the communication device and to generate the detection signal (RS) with the aid of the characteristic value signal dependent upon the comparison result signal.

5. A communication device as claimed in claim 4, wherein the characteristic value signal is formed with the aid of time data.

6. The communication device as claimed in claim 1 further comprising a transmitter for supplying to data carriers within the communication range, via a communication coil, a load-modulated carrier signal dependent on the position of the data carrier relative to a reference point of the communication range.

7. The communication device as claimed in claim 4 wherein there are two characteristic value signals and one of said characteristic value signals includes time data.

8. The communication device as claimed in claim 1 wherein the detection means detects said value (V) representative of the maximum amplitude value of the data carrier signal and without a determination of the actual amplitude value thereof.

9. The communication device as claimed in claim 1 wherein the detection means comprises means for comparing successive (in time) data carrier signals with different magnitude amplitude values (A1, A2), which comparison forms the basis for deriving the detection signal (RS).

10. The communication device as claimed in claim 1 wherein the detection means detects a value (V) representative of the maximum amplitude value of the data carrier signal (DS) supplied by a data carrier and is adapted to generate and supply a detection signal (RS) upon detection of the value (V) representative of the maximum amplitude value, and independently of the frequency of data carrier signals.

11. A communication device for communication with one or more data carriers movable through a communication range along a predetermined path, the communication device comprising:
    means for receiving via a communication coil a data carrier signal from a data carrier when situated within the communication range, wherein the received data carrier signal has different amplitude values dependent upon the orientation of a data carrier with respect to the communication coil as it passes through the communication range, and
    detection means responsive to a further data carrier signal from the receiving means for detecting a signal value representative of the maximum amplitude value of the data carrier signal and irrespective of the actual amplitude value of the received data carrier signal, and adapted to supply a detection signal (RS) upon detection of the value representative of the maximum amplitude value.

12. The communication device as claimed in claim 11 wherein the detection means produces said detection signal in relation to a reference point of said communication range and independent of the orientation of the data carrier with respect to the communication coil as the data carrier passes through the communication range.

13. The communication device as claimed in claim 12 wherein said reference point is the midpoint of said communication range.

14. The communication device as claimed in claim 6 wherein the detection means comprises:
    control means responsive to said further data carrier signal for controlling the allocation of first and second detected amplitude values (A1, A2) to amplitude value memory means and to comparison means, wherein
    the comparison means compares a stored first amplitude value (A1) from the amplitude value memory means with a subsequent second amplitude value (A2) and generates a comparison result signal (CS), and
    the detection means derives the detection signal (RS) on the basis of the comparison result signal (CS).

15. The communication device as claimed in claim 11 wherein the detection means comprise:

comparison means for comparing a first amplitude value (A1) with a subsequent second amplitude value (A2) and which generates a comparison result signal (CS), means responsive to the further carrier data signal to supply a first characteristic value signal (KW1) identifying a data carrier within the communication range, a time data generator supplying time data forming a second characteristic value signal (KW2), and a detection signal generator which receives the comparison result signal (CS) and receives at least one characteristic value signal (KW1, KW2) and which generates the detection signal (RS).

16. The communication device as claimed in claim 11 which uses a time-slot process to provide time sequential communication of the communication device with each of a plurality of data carriers within its communication range.

17. The communication device as claimed in claim 11 further comprising a transmitter for supplying to data carriers within the communication range, via the communication coil, a load-modulated carrier signal dependent on the position of the data carrier relative to a reference point of the communication range.

* * * * *